(12) United States Patent
Dippl et al.

(10) Patent No.: US 8,495,634 B2
(45) Date of Patent: Jul. 23, 2013

(54) METHOD FOR THE MANAGEMENT OF TASKS IN A DECENTRALIZED DATA NETWORK

(75) Inventors: Sebastian Dippl, München (DE); Christoph Gerdes, München (DE); Gerd Völksen, München (DE)

(73) Assignee: Atos IT Solutions and Services GmbH, Munich (DE)

( * ) Notice: Subject to any disclaimer, the term of this patent is extended or adjusted under 35 U.S.C. 154(b) by 426 days.

(21) Appl. No.: 12/812,086

(22) PCT Filed: Dec. 22, 2008

(86) PCT No.: PCT/EP2008/068175
§ 371 (c)(1),
(2), (4) Date: Jul. 8, 2010

(87) PCT Pub. No.: WO2009/087056
PCT Pub. Date: Jul. 16, 2009

(65) Prior Publication Data
US 2010/0287557 A1    Nov. 11, 2010

(30) Foreign Application Priority Data
Jan. 8, 2008   (DE) .......................... 10 2008 003 500

(51) Int. Cl.
*G06F 9/46*    (2006.01)
*G06F 15/76*   (2006.01)
*G06F 9/26*    (2006.01)
*G06F 9/34*    (2006.01)
*G06F 15/16*   (2006.01)

(52) U.S. Cl.
USPC ............ 718/100; 712/28; 711/200; 711/216; 709/201

(58) Field of Classification Search
None
See application file for complete search history.

(56) References Cited

U.S. PATENT DOCUMENTS
6,782,389 B1    8/2004   Chrin et al. .................... 707/10
2005/0114862 A1   5/2005   Bisdikian et al. ............. 718/105

OTHER PUBLICATIONS

Bozygit, M., et al., "User-Level Process Checkpoint and Restore for Migration", Dept. of Information and Computer Science King Fahd University of Petroleum and Minerals, Saudi Arabia: XP001083229; pp. 86-96.
International Search Report and Written Opinion for Application No. PCT/EP2008/068175 (14 pages), Jun. 2, 2009.
Voras et al. "Network Distributed File System in User Space." 28$^{th}$ International Conference on Information Technology Interfaces pp. 669-674 (6 pages), Jun. 19, 2006.

(Continued)

*Primary Examiner* — Qing Wu
(74) *Attorney, Agent, or Firm* — King & Spalding L.L.P.

(57) ABSTRACT

In a method for the management of tasks in a decentralized data network with a plurality of nodes for carrying out the tasks, resources are distributed based on a mapping rule, in particular a hash function. A task that is to be suspended is distributed by dividing the process image of the task into segments and by distributing the segments over the nodes using the mapping rule. Thus, a distributed swap space is created so that tasks can also be carried out on nodes whose swap space is not sufficient on its own. The method can be used in embedded systems with a limited storage capacity and/or in a voltage distribution system, wherein the nodes are, for example, switching units in the voltage distribution system. The method can also be used in any other technical systems such as, for example, a power generation system, an automation system and the like.

21 Claims, 6 Drawing Sheets

OTHER PUBLICATIONS

Dabek et al. "Wide-Area Cooperative Storage with CFS." XP-002298332 http://pdos.ics.mit.edu/chord/ (14 pages), Oct. 21, 2001.

Hitch "Status Save/Restore/Modify of a Unit of Work." IBM Technical Disclosure Bulletin vol. 24 (2 pages), Jan. 1, 1982.

Stoica et al. "Chord: A Scalable Peer-to-Peer lookup Protocol for Internet Applications." IEEE/ACM Transactions on Networking vol. 11 (16 pages), Feb. 1, 2003.

METHOD FOR THE MANAGEMENT OF TASKS IN A DECENTRALIZED DATA NETWORK

CROSS-REFERENCE TO RELATED APPLICATIONS

This application is a U.S. National Stage Application of International Application No. PCT/EP2008/068175 filed Dec. 22, 2008, which designates the United States of America, and claims priority to DE Application No. 10 2008 003 500.9 filed Jan. 8, 2008. The contents of which are hereby incorporated by reference in their entirety.

TECHNICAL FIELD

The invention relates to a method for the management of computing processes in a decentralized data network comprising a plurality of network nodes for executing the processes, wherein resources are distributed in the data network based on a mapping rule, especially a hash function. In addition the invention relates to a corresponding data network.

BACKGROUND

In technical systems in which technical devices with restricted memory requirements are networked via a decentralized data network the particular problem exists of it not being possible to execute large computing processes since the capacity of the individual main memories of the technical devices is not sufficient for swapping the processes. There is therefore a requirement for a solution in which, even in decentralized networks containing network nodes with small memory capacity, a plurality of computing processes and larger processes are able to be executed.

Centralized solutions for executing processes on servers are known from the prior art, with a memory being used as swap space which does not lie on the server on which the computing process to be relocated is currently being executed.

SUMMARY

According to various embodiments a method for management of computing processes for a decentralized data network can be created in which, even with restricted memory space on the individual network nodes, execution of a number of computing processes and especially also of larger processes is made possible.

According to an embodiment, a method for managing computing processes in a decentralized data network comprising a plurality of network nodes for executing the processes, with resources being distributed in the data network based on a mapping rule, especially a hash function, may comprise: a) One or more computing processes executed on a network node and to be suspended in each case is or are stopped and a process image is created for each stopped computing process; b) The process image of a respective computing process is broken down into slices; c) The slices of the process image of the respective computing process are distributed with the aid of the mapping rule to the network nodes, which creates a distributed process image.

According to a further embodiment, the process image in step b;) may be essentially split up into slices of the same size. According to a further embodiment, the slices distributed in step c) can be stored in respective main memories in the network nodes, especially in RAMs of the network nodes. According to a further embodiment, the method can be used in a data network in which each network node is responsible for a pre-specified quantity of hash values able to be generated by the hash function. According to a further embodiment, the data network may be a peer-to-peer network based on a distributed hash table, in which a range of hash values is divided up into hash value intervals and each network is responsible for a hash value interval. According to a further embodiment, in step c) a keyword unique in the decentralized data network can be generated for each slice of the process image of a respective computing process, with the keyword being mapped with the hash function to a hash value and the slice, for which the keyword was generated being stored in the network node which is responsible for the hash value to which the keyword was mapped. According to a further embodiment, a keyword for a slice of a process image of the respective computing process can be created from information about the respective computing process and an identification for the slice, especially a slice number. According to a further embodiment, the information about the respective computing process and/or the keyword can be stored in the network node which has executed the relevant computing process before it was stopped, and/or in which the information about the relevant computing process and/or the keyword is managed by a process management method. According to a further embodiment, the information about the respective computing process may comprise a process identification of the relevant computing process and/or an identification of the process image of the respective computing process. According to a further embodiment, the process based on a distributed process image may be resumed by a network node intended for the resumption of the process by means of the following steps: i) Finding and storing the slices of the distributed process image distributed to the network nodes with the aid of the mapping rule, especially the hash function, in the network node intended for resumption of the process; ii) Combining the slices into the process image and starting the process based on the process image in the network node intended for resumption. According to a further embodiment, the network node intended for resumption of the process can be the same network node that has executed the process before it was stopped. According to a further embodiment, the network node intended for resumption of the process can be a different network node from the one that has executed the process before it was stopped. According to a further embodiment, in step c) a keyword unique in the decentralized data network can be generated for each slice of the process image of a respective computing process, with the keyword being mapped with the hash function to a hash value and the slice, for which the keyword was generated being stored in the network node which is responsible for the hash value to which the keyword was mapped, the process based on a distributed process image can be resumed by a network node intended for the resumption of the process by means of the following steps: i) Finding and storing the slices of the distributed process image distributed to the network nodes with the aid of the mapping rule, wherein the mapping rule may include the hash function, in the network node intended for resumption of the process; ii) Combining the slices into the process image and starting the process based on the process image in the network node intended for resumption, and a respective slice of the distributed process image can be found in step i) by the keyword of the respective slice being mapped with the hash function to a hash value and, based on the hash value, the network node being found on which the respective slice is stored. According to a further embodiment, the process based on the process image can be started in step ii) such that the assembled process image is loaded into a memory of the network node intended for resumption of the process and is subsequently executed in the main memory. According to a further embodiment, the method can be used in the data network of a technical system with a plurality of technical components, with at least a part of the technical components representing a network node of the data network in each case.

According to a further embodiment, the technical system may comprises an energy distribution network, especially an energy distribution substation, with the technical components especially comprising switching units in the energy distribution network. According to a further embodiment, the technical system may comprises an energy generating system, especially an energy generating system based on turbines. According to a further embodiment, the technical system may comprise an automation system, especially a production line.

According to another embodiment, a decentralized data network may comprise a plurality of network nodes for executing computing processes, with resources in the data network being distributed in the network on the basis of a mapping rule, especially a hash function, and with the data network being embodied such that the computing processes are managed with a method, in which: a) one or more computing process to be executed on a network node and to be suspended in each case is or are stopped and a process image is created for each stopped computing process; b) the process image of a respective computing process is broken down into slices; c) the slices of the process image of the respective computing process are distributed with the aid of the mapping rule to the network nodes, which creates a distributed process image.

According to a further embodiment of the decentralized data network, the data network may be embodied such that a method as described above is able to be executed in the data network.

BRIEF DESCRIPTION OF THE DRAWINGS

Exemplary embodiments are explained in detail below with reference to the enclosed figures.

The figures show.

DETAILED DESCRIPTION

Figure 1:
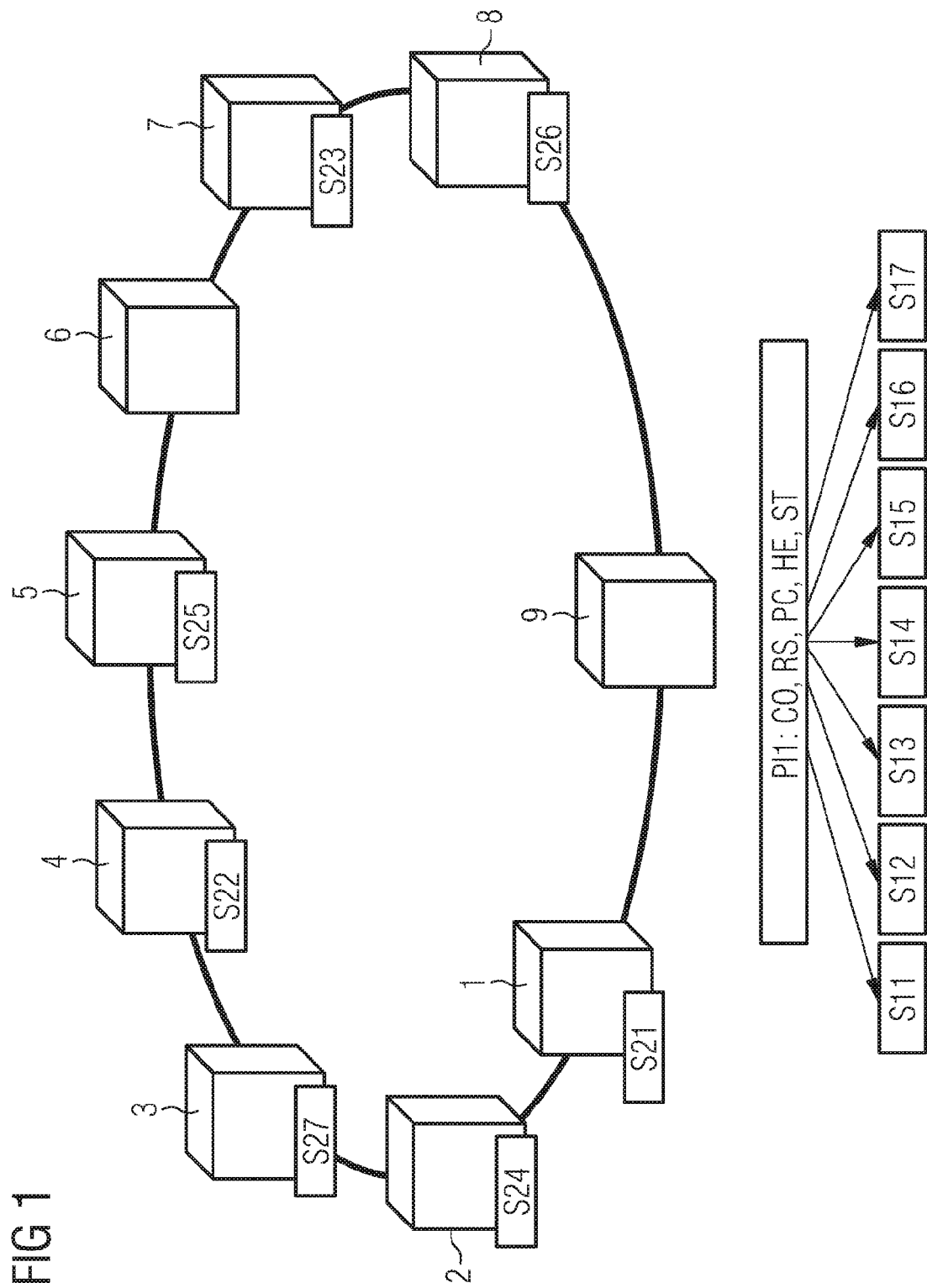
FIG. 1 to FIG. 3 schematic views of a peer-to-peer network on the basis of which the distribution of an image to a number of peers is illustrated in accordance with an embodiment.
Figure 2:
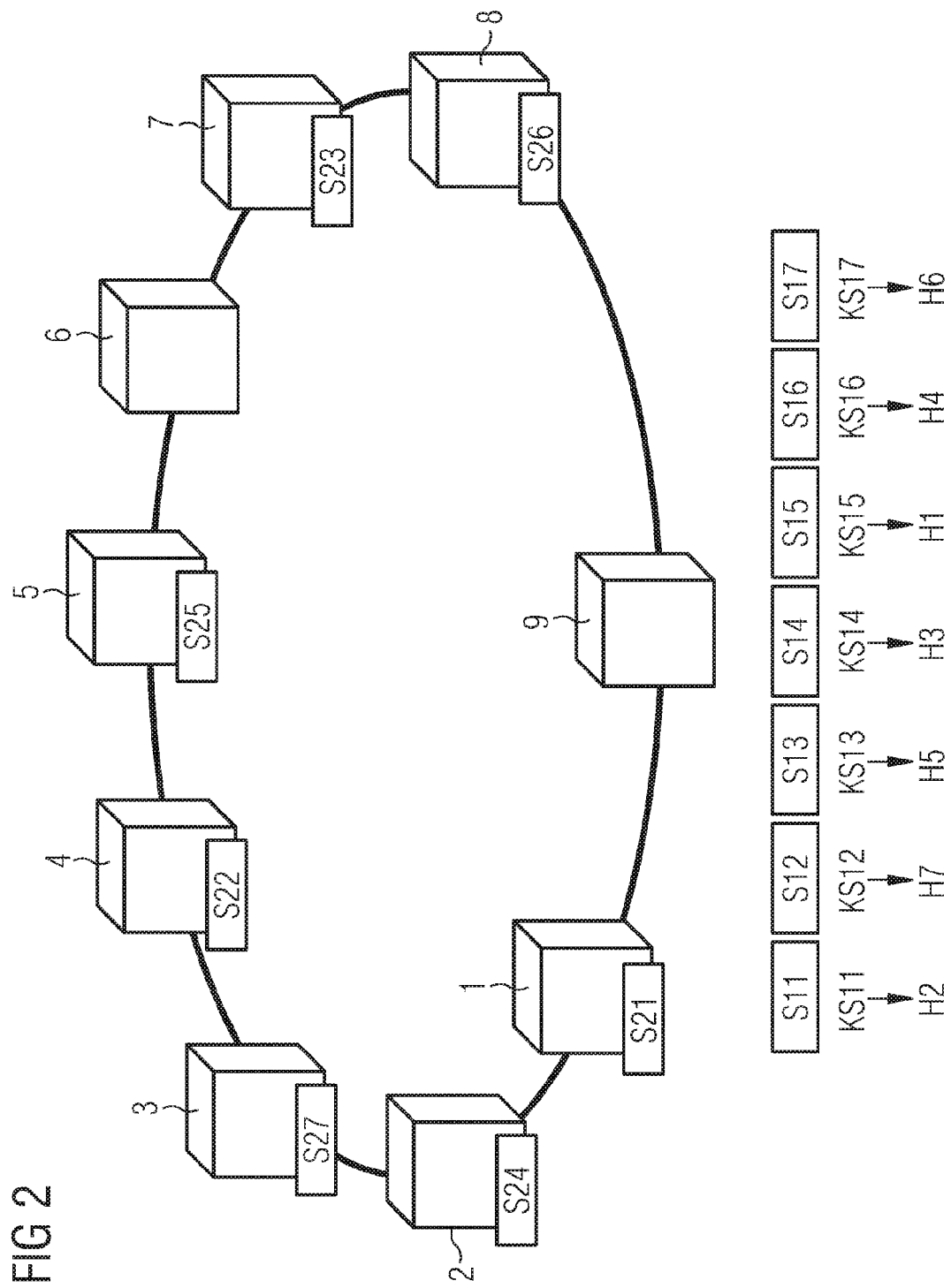

The method according to various embodiments is used in a decentralized data network in which resources are distributed to the individual network nodes with a mapping rule, preferably with a hash function. Hash functions are sufficiently known from the prior art, an example of such a function is SHA1. In particular the mapping of a large data space onto a compressed smaller data space with fixed bit length is achieved with a hash function. Preferably hash functions are also one-way functions, i.e. the original data element to which the hash function was applied cannot be derived from the hash value generated from a hash function. Different hash functions can have yet further specific characteristics, in particular hash functions are preferably chaotic, i.e. similar source elements of the function lead to completely different hash values, whereby an even distribution of resources in the data network is achieved. The invention is however not restricted to hash functions, and other types of functions for distribution of the resources can also be used if necessary, with these functions preferably having to have similar characteristics to hash functions.

In accordance with the method according to various embodiments, in a step a) one or more computing processes, executed on a network node and to be suspended in each case, is stopped and a process image for each stopped process is created. The process image (usually referred to simply as the image) represents in this case a memory image of the process in the state in which the process was stopped. This image is divided up in such cases for each stopped task into slices (step b)). The slices are finally distributed in a step c) with the aid of the mapping rule, especially the hash function, to the network nodes, so that a distributed image is created in the data network.

The method according to various embodiments thus also uses the mapping rule generally used in decentralized data networks for the distribution of resources for distributing slices of a stopped task. Consequently processes can be swapped in a simple manner with existing mechanisms using distributed swap space, even if the memory space of an individual network node is not sufficient for swapping the individual process.

In an embodiment, the image is essentially split up into slices of the same size in step b), through which an even distribution of the slices to the network nodes is made possible.

Step c) of the method according to various embodiments is realized in a further embodiment by the distributed slices being stored in respective main memories in the network nodes, especially in RAMs of the network nodes.

As already shown, the method according to various embodiments is preferably used in a decentralized data network in which resources are distributed on the basis of a hash function. In particular in this case each network node of the data network is responsible for a pre-specified quantity of hash values able to be generated by the hash function. Preferably in this case a peer-to-peer network is used which is based on a distributed hash table. Distributed hash tables are sufficiently known from the prior art. With these tables a range of hash values is subdivided into hash value intervals and each network node is responsible for one hash value interval.

In a further embodiment, in step c) a unique keyword for each slice of the image is generated in the decentralized data network, with the keyword being mapped with a hash function onto a hash value and the slice from which the keyword was generated being stored in the network node which is responsible for the hash value for which the keyword was mapped. The keyword for a slice can in this case be created in any way; preferably the keyword is created from information about the respective process to which a slice belongs as well as by an identifier for the slice, especially a slice number.

Especially when the process is to be continued at the same network node at which it was previously stopped, the information for the respective process and/or the keyword will be stored in the network node which has executed the respective task before it was stopped. If necessary it is also possible for the information about the respective task and/or the keyword to be managed by a process management method, such as round robin, priority queue and the like for example. The information about the respective process comprises unique identifiers for identifying the task, for example a process identifier of the process and/or an identifier of the slice of the respective process.

The process underlying the process map distributed with the method according to various embodiments is resumed in an embodiment based on the following steps:

i) Finding and storing the slices of the distributed process image distributed to the network nodes with the aid of the mapping rule, especially the hash function, in the network node intended for the resumption of the process;

ii) Combining the slices into the process image and starting the process based on the process image in the network node intended for resumption.

In an embodiment, the process is resumed again in such cases in the network node that has executed the process before it was stopped. If necessary it is however also possible for the network node intended for the resumption of the process to be a network node other than the one that has executed the process before it was stopped.

In an embodiment, in which keywords are used for distributing the slices of the process image, a respective slice of the distributed process image is found by the keyword of the respective slice being mapped by the hash function onto a hash value and, based on the hash value, the network node being found on which the respective slice is stored.

The starting of a process based on a process image is undertaken in an embodiment such that the assembled process image is loaded into the main memory of the network node intended for resumption of the process and subsequently executed in the main memory.

The method according to various embodiments is especially suitable for use in a technical system with a plurality of technical components, with the at least one part of the technical components in each case representing a network node of the data network. The technical components thus do not have to be pure computers but can also involve technical devices with lower computing power and little memory space, as are used in so-called "embedded systems" for example. Based on the method according to various embodiments, larger processes can now also be executed for technical systems with such devices, since the processes are swapped distributed in the network by including the memory of further devices.

An example of a technical system in which the method according to various embodiments can be used is an energy distribution network, especially an energy distribution substation in which the technical components especially comprise switching units in the energy distribution network. Likewise the method according to various embodiments can for example be used in an energy generation system, especially in an energy generation system based on turbines. Further areas of application are automation systems such as production lines for example.

As well as the method described above, various embodiments further relate to a decentralized data network with a plurality of network nodes for executing the processes, with the decentralized data network being embodied such that in the network each of the above described embodiments is able to be executed.

An exemplary embodiment will be described below in relation to FIG. 1 to FIG. 6, based on a peer-to-peer network comprising nine peers or network nodes 1, 2, . . . , 9. The peer-to-peer network is embodied here as a logical ring structure, for example in the form of a chord ring. This type of peer-to-peer network is sufficiently known from the prior art and will therefore not be explained in any greater detail here. Resources, typically in the form of files, are distributed in this network based on a distributed hash table. In such cases a range of hash values is subdivided into intervals and each of the peers is responsible for an interval of hash values. The resources to be distributed in the network are assigned keywords and these keywords are converted into hash values with the aid of a hash function, for example with the function SHA1. That peer which is responsible for the interval including the hash value generated from the keyword then stores the corresponding resource. If necessary resources can also be replicated in the network, i.e. copies of the resources are stored on a number of network nodes. This means that the resources continue to be available even if a peer fails. This replication can also be applied to the distribution of slices of an image described below so that copies of each slice are stored on a number of network nodes.

The individual peers in the network of FIG. 1 represent individual devices with a processor for executing computing processes. For example the system of FIG. 1 could involve a so-called "embedded system", in which the individual peers represent technical devices of a technical system, for example technical components of a switching unit for a power distribution system. Such technical components mostly only have a restricted memory capacity and are therefore only suitable to some extent for executing a plurality of different sizes of program in a contending execution sequence. One of the reasons for this is that such components mostly have a small main memory and therefore only have the ability to a limited extent to swap large processes with the help of the main memory, i.e. move them around or relocate them. To make it possible despite this to execute large processes on such embedded systems, in accordance with various embodiments a distributed swap space is created by a process to be suspended in the program sequence being swapped to a plurality of peers.

FIG. 1 shows a scenario in which preparations are being made for swapping a first process. To this end a memory image or process image of the process to be suspended and swapped is created first of all. This image contains different components of the process and especially represents an image of the main memory of that peer which has previously executed the process. In FIG. 1 this process image is labeled PI1, and typically the program code CO, the register settings RS, of the program counter PC, the status of the heap HE and also the status of the stack ST are specified as components of the image. This process image is now divided up into a plurality of slices, with the individual slices preferably being essentially the same size, so that the process image is divided up by the slices without taking into consideration the content. This means that the individual slices do not necessarily contain entire components of the image, but the components can extend over a number of slices. In the example of FIG. 1 the process image PI1 has been divided up into a total of seven slices S11, S12, S13, S14, S15, S16 and S17. In this case it can typically occur that two adjacent slices include elements of the code CO.

FIG. 1 also shows the slices of a further second process, with the slices already having been distributed based on the method according to various embodiments to individual peers. The second process has likewise been divided up here into seven slices, which are labeled in FIGS. 1 as S21, S22, S23, S24, S25, S26 and S27. Based on the division undertaken, slice S21 has been stored here on peer 1, slice S22 on peer 4, slice S23 on peer 7, slice S24 on peer 2, slice S25 on peer 5, slice S26 on peer 8 and slice S27 on peer 3.

After the process image PI1 has been split up into the corresponding slices S11 to S17, the slices are allocated in the next step to corresponding hash values. This step is illustrated in the lower part of FIG. 2. In this case a corresponding keyword KS11, KS12, . . . , KS17 is initially defined for each of the slices S11 to S17. This keyword is unique for the respective slice and can for example be composed of an identifier of the process underlying the process image PI1 and/or an identifier of the process image itself, with each slice further being identified by a specific number. In particular the slices are numbered in this case with numbers in ascending order in accordance with the position of the slice within the distribution.

Like the generation of hash values from the keywords of resources, corresponding hash values are now created from the keywords KS11 to KS17 based on the hash function used in the peer-to-peer network. These hash values are labeled in FIGS. 2 as H1 to H7, with the number of the respective hash value showing which of the peers 1 to 9 is responsible for this hash value, i.e. which peer contains the interval containing the corresponding hash value. This means in other words that peer 2 is responsible for the hash value H2, peer 1 is responsible for the hash value H1, peer 3 is responsible for the hash value H3, peer 4 is responsible for the hash value H4, peer 5 is responsible for the hash value H5, peer 6 is responsible for the hash value H6 and peer 7 is responsible for the hash value H7. In accordance with FIG. 2 the result of the hash function is that the hash value H2 is created from the keyword KS11, the hash value H7 from the keyword KS12, the hash value H6 from the keyword KS13, the hash value H3 from the keyword KS14, the hash value H1 from the keyword KS15, the hash value H4 from the keyword KS16 and the hash value H6 from the keyword KS17.

Figure 3:
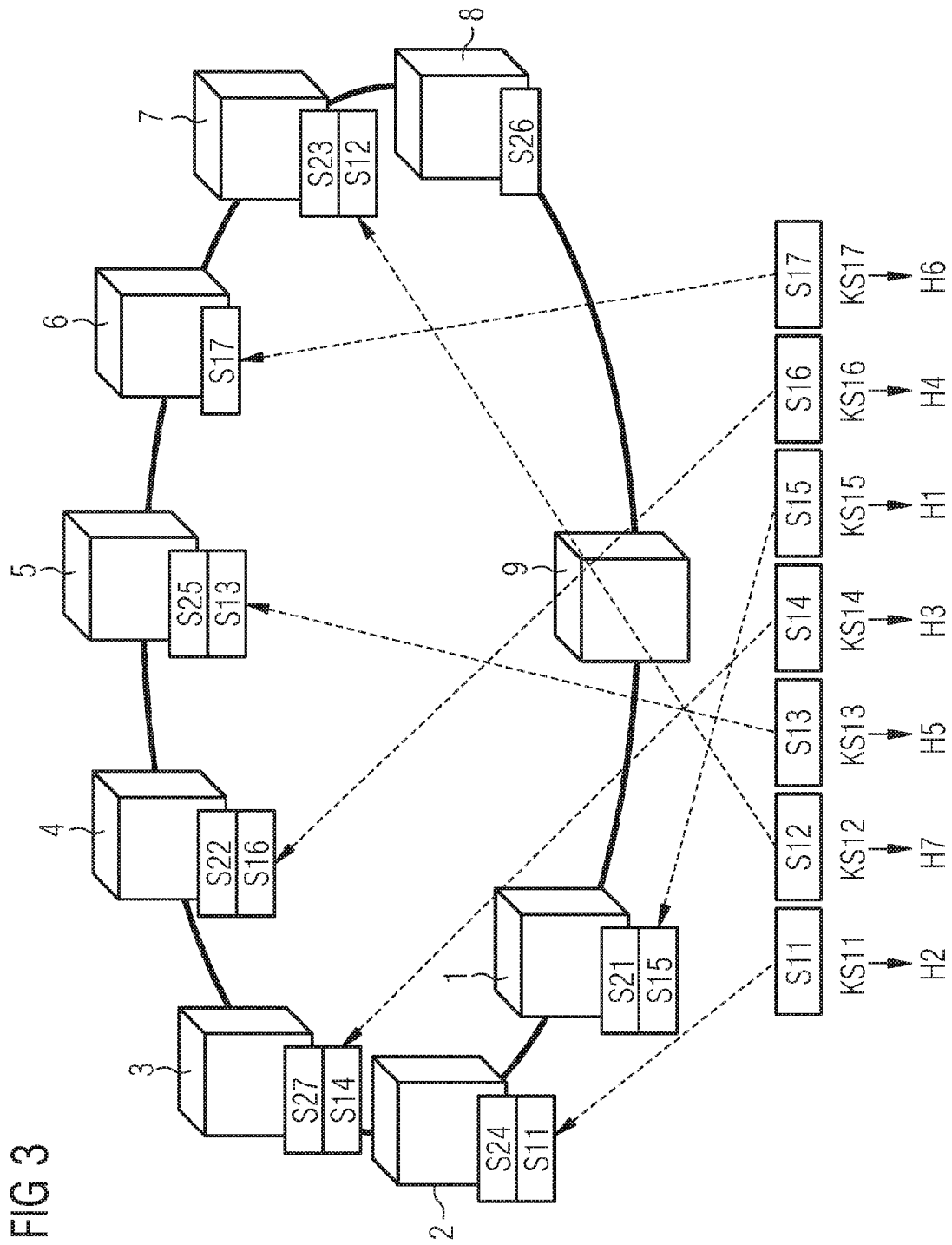

In a next step, which is illustrated in FIG. 3, the slices S11 to S17 of the process image PI1 are now distributed to the peers based on the hash values generated with the hash function. In this case a slice of the process image is stored on that peer which is responsible for the hash value created from the slice. As shown by the dashed-line arrows in FIG. 3, this means that slice S11 is stored on peer 2, slice S12 on peer 7, slice S13 on peer 5, slice S14 on peer 3, slice S15 on peer 1, slice S16 on peer 4 and also slice S17 on peer 6. Thus peers 1, 2, 3, 4, 5 and 7 now contain slices both from the first process and also from the second process. By contrast peer 6 contains only one slice from the first process, i.e. slice S17, and peer 8 only one slice from the second process, namely slice S26. The individual slices in this case are stored in the main memories of the peers, with the main memories preferably being RAMs. A distributed swap space is therefore created by a plurality of the main memories on the different peers, so that process swapping is also possible in peer-to-peer networks in which the individual peers do not have sufficient capacity for swapping a process. The condition must merely be fulfilled that sufficient RAM capacity is available in the overall peer-to-peer network to enable all idle processes to be stored.

It will now be explained on the basis of FIGS. 4 to 6 how the slices of a swapped process image can be assembled again in order to resume the process. This is described on the basis of the swapped second process, of which the process image comprises the slices S21 to S27. In the form of embodiment described below the swap process is accepted again in this case by that peer which has also been executing the process previously. In this case it should be noted that the swapping of the second process occurs in the same way as previously described for the first process. The keywords used for swapping the individual process slices have been stored in this case in the peer which has previously executed the process. If necessary the keywords can however also be generated again from corresponding information about the process, especially from the process identifier or the identifier of the process image, in combination with a corresponding number of the slice.

Figure 4:
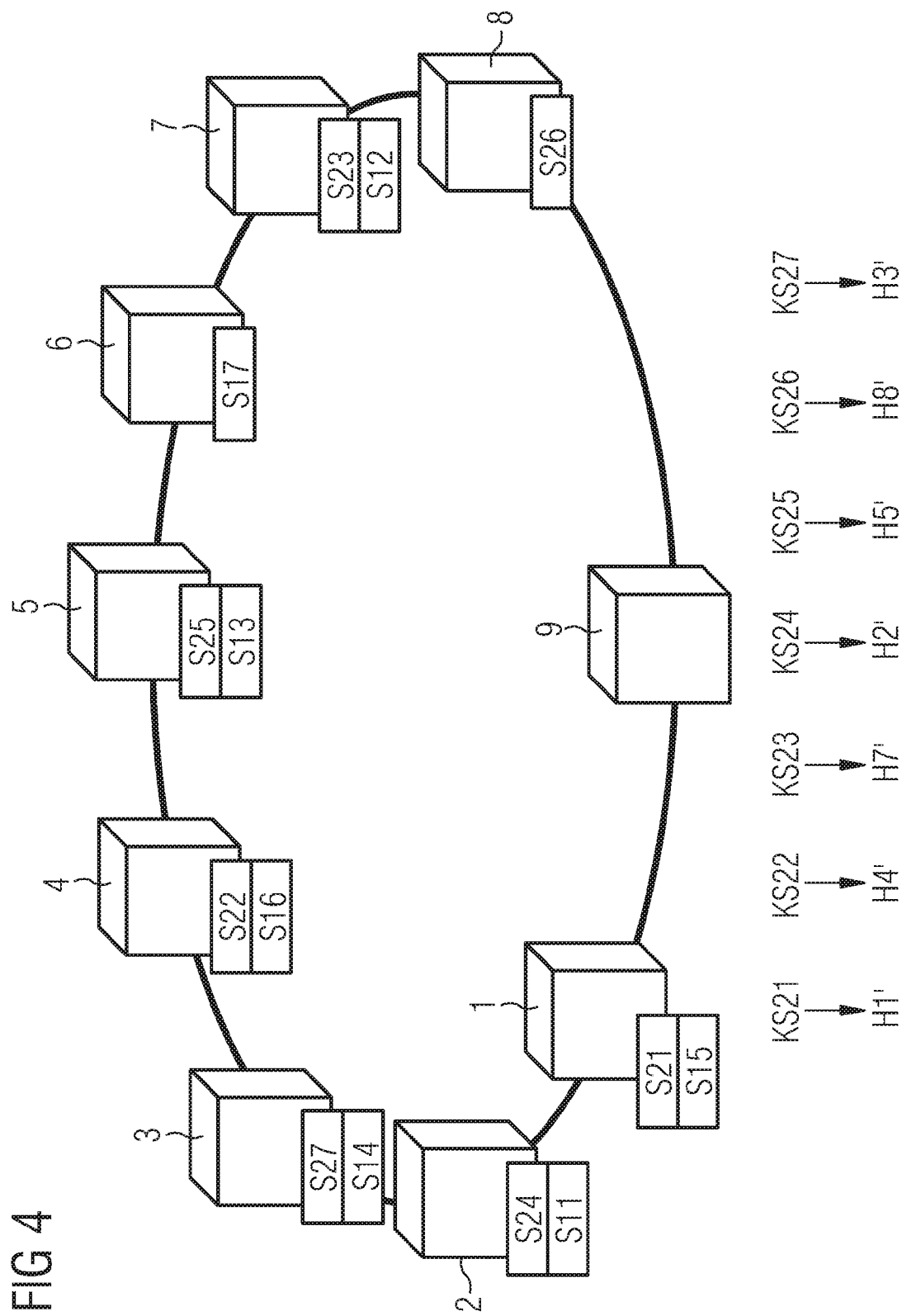
FIG. 4 to FIG. 6 schematic views of a peer-to-peer network on the basis of which the combining of a distributed process image for resumption of the process is illustrated based on an exemplary embodiment.

As emerges from FIG. 4, the keywords KS21, KS22, KS23, KS24, KS25, KS26 and also KS27 for the second process are contained in the corresponding peer which resumes the process. The keyword KS21 was generated in this case based on the slice S21, the keyword KS22 based on the slice S22, the keyword KS23 based on the slice S23, the keyword KS24 based on the slice S24, the keyword KS25 based on the slice S25, the keyword KS26 based on the slice S26 and the keyword KS27 based on the slice S27. The corresponding hash value is now once again generated with the aid of the hash function used in the peer-to-peer network. In particular the hash value H1' is generated from the keyword KS21, the hash value H4' is generated from the keyword KS22, the hash value H7' is generated from the keyword KS23, the hash value H2' is generated from the keyword KS24, the hash value H5' is generated from the keyword KS25, the hash value H8' is generated from the keyword KS26 and the hash value H3' is generated from the keyword KS27. The digits in the hash value again show which of the peers is responsible for the corresponding hash value in accordance with the distributed hash table.

Figure 5:
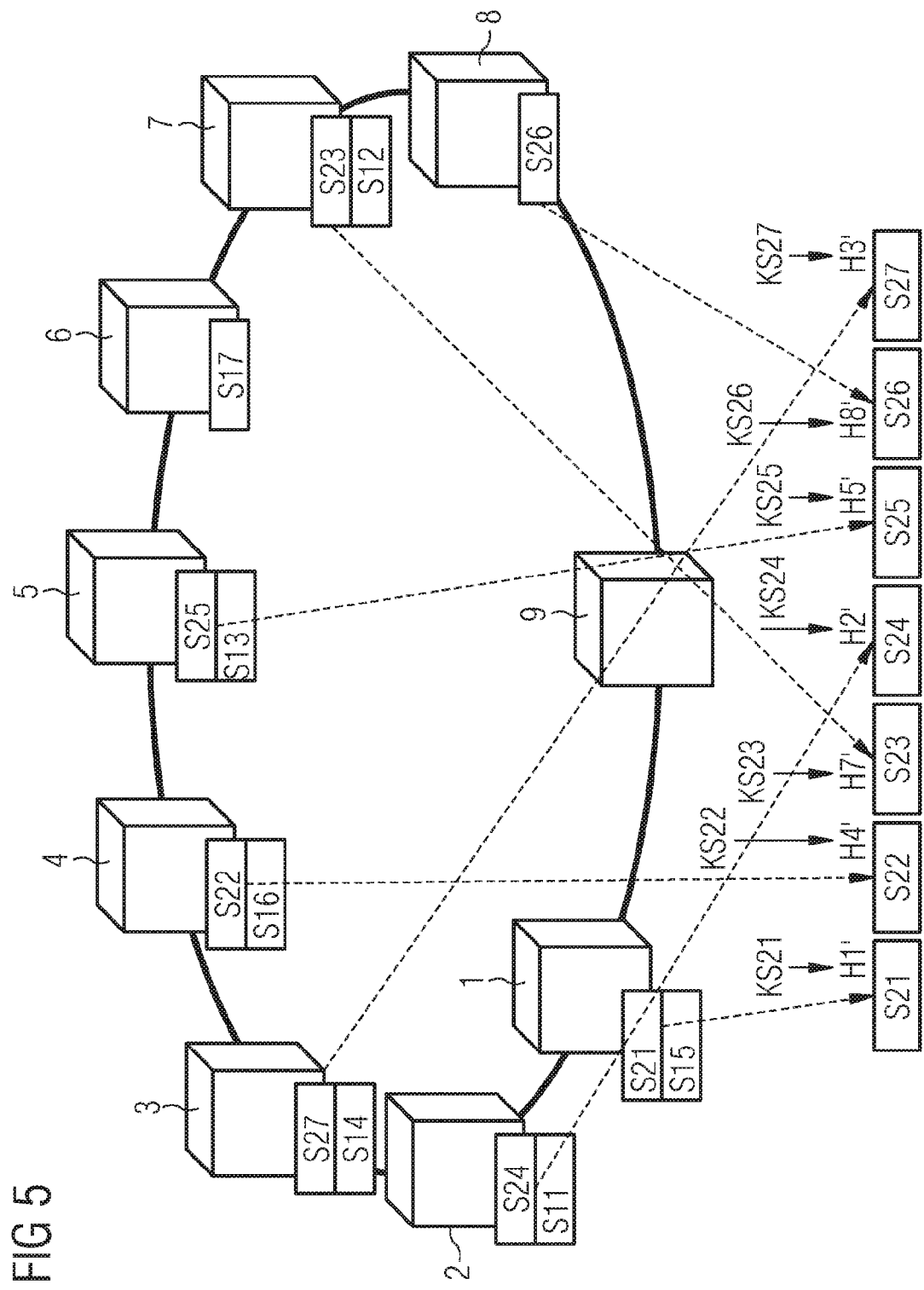

As shown in FIG. 5, the corresponding peers which are responsible for the hash values H1' to H7' and which consequently contain the corresponding slices S21 to S27 are subsequently found with the aid of the peer-to-peer protocol used. These slices are then downloaded to the peer which is to resume the process. The downloading of the corresponding slices in this case in indicated in FIG. 5 by corresponding dashed-line arrows. Finally the individual slices S21 to S27 are available in the peer which is to resume the process.

Figure 6:
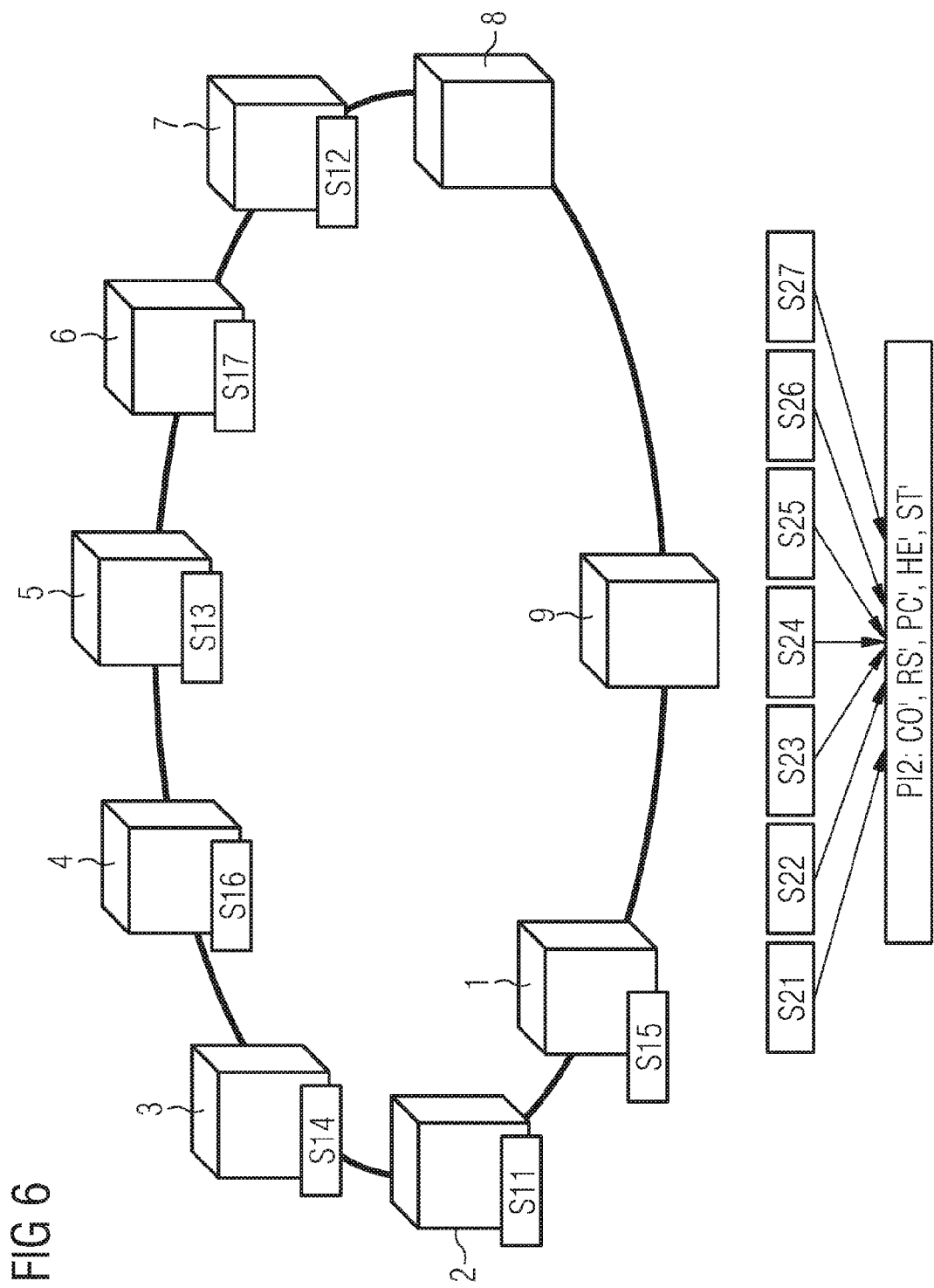

FIG. 6 shows the scenario after the slices S21 to S27 have been downloaded, which is evident from that fact that the individual peers now only still contain the slices S11 to S17 of the first process. FIG. 6 further shows the concluding step of the method in which the individual downloaded slices S21 to S27 are now assembled in accordance with their numbering again into a process image PI2 of the second process. Individual elements of the process image PI2 are again specified in FIG. 6, namely the code CO', the register setting RS', the program counter PC', the status of the heap HE' and the status of the stack ST'. The process image PI2 is finally loaded into the main memory of the peer intended for resumption of the process, and the execution of the process is continued.

As already mentioned above, in the embodiment of the method described above that peer is used for executing the process again which has already executed the process previously. However this does not absolutely have to be the case, and if necessary mechanisms can also be provided according to which another peer resumes the process. The management of the process execution can be taken over here by known process management methods, such as round robin, priority queue and the like for example.

What is claimed is:

1. A method for managing computing processes in a decentralized data network comprising a plurality of network nodes for executing the processes, with resources being distributed in the data network based on a mapping rule, wherein the mapping rule may include a hash function, the method comprising:
   a) stopping one or more computing processes executed on a network node and to be suspended and creating a process image for each stopped computing process;
   b) breaking down the process image of a respective computing process into slices; and
   c) distributing the slices of the process image of the respective computing process with the aid of the mapping rule to the network nodes, which creates a distributed process image.

2. The method according to claim 1, wherein the process image in step b) is split up into slices of the same size.

3. The method according to claim 1, wherein the slices distributed in step c) are stored in respective main memories in the network nodes.

4. The method according to claim 1, wherein the method is used in a data network in which each network node is responsible for a pre-specified quantity of hash values able to be generated by the hash function.

5. The method according to claim 4, wherein the data network is a peer-to-peer network based on a distributed hash table, in which a range of hash values is divided up into hash value intervals and each network is responsible for a hash value interval.

6. The method according to claim 4, wherein in step c) a keyword unique in the decentralized data network is generated for each slice of the process image of a respective computing process, with the keyword being mapped with the hash function to a hash value and the slice, for which the keyword was generated being stored in the network node which is responsible for the hash value to which the keyword was mapped.

7. The method according to claim 6, wherein a keyword for a slice of a process image of the respective computing process is created from information about the respective computing process and an identification for the slice, wherein the identification can be a slice number.

8. The method according to claim 7, wherein at least one of the information about the respective computing process and the keyword is stored in the network node which has executed the relevant computing process before it was stopped, and/or in which at least one of the information about the relevant computing process and the keyword is managed by a process management method.

9. The method according to claim 7, wherein the information about the respective computing process comprises at least one of a process identification of the relevant computing process and an identification of the process image of the respective computing process.

10. The method according to claim 4, wherein in step c) a keyword unique in the decentralized data network is generated for each slice of the process image of a respective computing process, with the keyword being mapped with the hash function to a hash value and the slice, for which the keyword was generated being stored in the network node which is responsible for the hash value to which the keyword was mapped,
wherein the process based on a distributed process image is resumed by a network node intended for the resumption of the process by the following steps:
i) finding and storing the slices of the distributed process image distributed to the network nodes with the aid of the mapping rule, wherein the mapping rule may include the hash function, in the network node intended for resumption of the process; and
ii) combining the slices into the process image and starting the process based on the process image in the network node intended for resumption,
and wherein a respective slice of the distributed process image is found in step i) by the keyword of the respective slice being mapped with the hash function to a hash value and, based on the hash value, the network node being found on which the respective slice is stored.

11. The method according to claim 1, wherein the process based on a distributed process image is resumed by a network node intended for the resumption of the process by the following steps:
i) finding and storing the slices of the distributed process image distributed to the network nodes with the aid of the mapping rule, wherein the mapping rule may include the hash function, in the network node intended for resumption of the process; and
ii) combining the slices into the process image and starting the process based on the process image in the network node intended for resumption.

12. The method according to claim 11, wherein the network node intended for resumption of the process is the same network node that has executed the process before it was stopped.

13. The method according to claim 11, wherein the network node intended for resumption of the process is a different network node from the one that has executed the process before it was stopped.

14. The method according to claim 11, wherein the process based on the process image is started in step ii) such that the assembled process image is loaded into a memory of the network node intended for resumption of the process and is subsequently executed in the main memory.

15. The method according to claim 1, wherein the method is used in the data network of a technical system with a plurality of technical components, with at least a part of the technical components representing a network node of the data network, respectively.

16. The method according to claim 15, wherein the technical system comprises an energy distribution network, wherein the energy distribution network may be an energy distribution substation, with the technical components comprising switching units in the energy distribution network.

17. The method according to claim 15, wherein the technical system comprises an energy generating system, wherein the energy generating system may be an energy generating system based on turbines.

18. The method according to claim 15, wherein the technical system comprises an automation system, wherein the automation system may be a production line.

19. A decentralized data network embodied in a combination of hardware and software, and comprising a plurality of network nodes including processors for executing computing processes, with resources in the data network being distributed in the network on the basis of a mapping rule, and with the data network being configured such that the computing processes causes:
a) one or more computing process to be executed by a processor on a network node and to be suspended in each case is or are stopped and a process image is created for each stopped computing process;
b) the process image of a respective computing process is broken down into slices;
c) the slices of the process image of the respective computing process are distributed with the aid of the mapping rule to the network nodes, which creates a distributed process image.

20. A decentralized data network according to claim 19, wherein the process image is split up into slices of the same size.

21. A decentralized data network according to claim 19, wherein the mapping rule comprises a hash function.

* * * * *